United States Patent Office 3,700,609
Patented Oct. 24, 1972

3,700,609
GRAFT COPOLYMERS
Geoffrey W. Tregear, North Clayton, Hendrik A. J. Battaerd, Nottinghill, Gunter A. Lang, Port Melbourne, Kevin Catt, Middle Park, and Hugh D. Niall, Armadale, Victoria, Australia, assignors to Imperial Chemical Industries of Australia and New Zealand Limited, Melbourne, Victoria, Australia
No Drawing. Continuation of abandoned application Ser. No. 628,818, Apr. 6, 1967. This application Feb. 1, 1971, Ser. No. 111,748
Claims priority, application Australia, Apr. 26, 1966, 4,671/66; Dec. 30, 1966, 16,002/66
Int. Cl. C08f 19/02, 41/04
U.S. Cl. 260—2.5 R                 28 Claims

ABSTRACT OF THE DISCLOSURE

A graft copolymer comprising a polymeric backbone and surface grafted on to it polymeric side-chains comprising a multiplicity of mer units of the formula

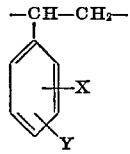

wherein X is at least one protein reactive group and Y stands for one or more optional substituents which is non-reactive with proteins. Processes of manufacture of the graft copolymer and its protein complexes are also described.

---

This application is a continuation of Ser. No. 628,818, filed Apr. 6, 1967, now abandoned.

This invention relates to new and useful copolymers; more particularly it relates to graft copolymers and to processes of their manufacture and use.

A graft copolymer has a backbone consisting of one polymer or copolymer onto which a number of side chains of another polymer or copolymer is grafted. Graft copolymers generally possess properties which are appreciably different from those of ordinary copolymers formed from the same monomer units but distributed at random in a straight or branched chain. Ordinary copolymers usually have properties intermediate between those of the two homopolymers, while the graft copolymers can possess some properties of each of the component polymers.

We have now discovered that certain graft copolymers may be chemically linked to proteinaceous substances and that the resulting particulate or continuous solid polymeric substances comprising macromolecules of graft copolymers with chemically bonded protein molecules have remarkable properties useful in biology, bioassay, medical prosthesis and medicine at large.

The coupling of amino-acids and peptide chains to a solid polymeric substance, cross-linked polystyrene, by means of covalent bonds is already known [Merrifield, J.A.C.S. 85, 2149, (1963)] and so is the ability of proteins to form chemical bonds with non-polymeric chemicals comprising isothiocyanato groups [McKinney et al., J. Immunology 93, 232, (1964)]. We have now conceived that polymeric substances having specifically designed surfaces of protein-reactive groups may be used to produce macromolecular phases, preferably solid substances in the form of particles, films, pellets, tablets or shaped articles, which have a surface layer capable of chemically bonding amino acids, peptides or proteins. In particular we have found that the graft copolymers in which the grafted-on mer unit is capable of accommodating a protein-reactive substituent are uniquely suitable for the formation of a dense outer surface of reactive groups. In its broadest concept our invention is therefore a graft copolymer comprising a polymeric backbone and grafted onto it a different copolymerisable co-mer having substituent groups which under protein-preserving conditions are capable of forming a chemical bond with an amino-acid, a peptide or a protein. Suitable co-mers may be any vinyl or divinyl compound polymerisable by free radicals as e.g. disclosed in British Pat. 801,528, p. 1, lines 68 to 77. Preferred graft copolymers are those in which styrene or substituted styrenes are grafted on to a polymeric backbone to form polystyrene side chains because protein reactive groups can be readily attached to these and because the resultant derivatives are highly reactive to proteins.

Accordingly we provide a graft copolymer comprising a polymeric backbone and surface-grafted on to it polymeric side chains comprising a multiplicity of mer-units of the formula

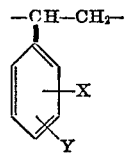

wherein X is at least one protein-reactive group and Y stands for one or more optional substituents which is non-reactive with proteins. Suitable groups Y are nitro, alkyl and halogen e.g. methyl or chlorine.

The base (or trunk) polymer forming the backbone is not narrowly critical nor is its method of manufacture. Thus e.g. the trunk polymers disclosed in British Pat. 801,528 (p. 1, lines 56 to 67) are suitable. A trunk polymer in accordance with the invention is any polymer capable of producing under ionizing radiation free radicals, as is well understood and conventional in the art. Suitable trunk polymers are thus, for instance, polyethylene, polypropylene, polyimides, polyparaxylylene or polytetrafluoroethylene. In immunoassay and in surgical applications high density of the protein-reactive groups on the surface and virtual absence of reactive groups inside the polymeric material is highly desirable; we have found that copolymers satisfying this requirement can be made when the backbone polymer is not dissolved, solvated or swelled by the reaction medium and/or the monomer. Preferred such backbone polymers are therefore the solvent resistant polymers of the fluorinated ethylenes, particularly polytetrafluoroethylene. Since one of the advantages of our copolymers is that the trunk polymer may be shaped to the desired article before grafting, it is preferable that it is not dissolved during the grafting step and/or the introduction of the protein-reactive group. Consequently we prefer that during the grafting or introduction of the protein-reactive group the reaction medium for example a solvent is chosen such that it does not dissolve the trunk polymer.

By protein-reactive groups we mean a group which under mild conditions under which peptides and proteins are not degraded is capable of forming a chemical bond with an amino-acid, a peptide or a protein. A first, preferred protein-reactive group is the isothiocyanate group which, in a manner known per se e.g. from McKinney, cited above, forms a thiourea-link with the amino group of the amino-acid; another, second protein-reactive group is the chloromethyl group —$CH_2Cl$ which may be reacted with the trialkyl ammonium salt of an amino-acid to form a methylene-ester linkage between the aromatic vinyl-mer unit and the carboxylic acid residue of the amino-acid in the manner described by R. B. Merrifield, J.A.C.S. 85, 2149 (1963); a further, third group which is protein-reactive when used together with carbodiimides

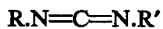

as coupling agents is the substituent —L.NHR″ where L is a non-acidic linking group preserving the basicity of the amino group by separating it from the aromatic ring of the styrene molecule; thus L may be e.g. one or more methylene groups, or an iminoethylene group e.g.

—NR‴.CH$_2$CH$_2$—

The latter is preferred. The coupling action of the carbodiimide linking the carboxylic acid group of an amino-acid with the basic amino group —L.NHR″ has been described by J. C. Sheehan and G. P. Hess in J.A.C.S. 77, 1067 (1955). R and R′ in the carbodiimide which may be the same or different are not narrowly critical and may be cycloalkyl, alkyl or aryl. Preferably R and R′ are such that the resultant substituted ureas are not precipitated in the reaction medium. R″ and R‴ which may be the same or different and are not narrowly critical may be alkyl, particularly alkyl having one to four carbon atoms. Yet another, fourth protein-reactive group is the diazonium salt

where Z⁻ is the residue of a strong acid e.g. Cl′, which salt is coupled with the amino groups of amino-acids in the manner described by Campbell (Proc. Nat. Acad. Sci. U.S., 37, 575 [1951] and by Yagi et al. (J. Immunology, 85, 375, [1960]).

Certain of the intermediates of our graft copolymers are also new compositions of matter; thus e.g. as far as we know none of the nitro-substituted surface-graft copolymers of styrene on the polymeric backbones as defined above have been prepared. Preferred copolymeric intermediates are the surface-grafts of nitro-styrene and amino-styrene on polytetrafluoroethylene. Yet another particularly preferred copolymeric intermediate is the graft of γ-nitroamino styrene on polytetrafluoroethylene. This copolymer is particularly preferred because of the activating properties of the nitro group. Copolymers wherein polystyrene is grafted on to a backbone polymer of polytetrafluoroethylene will be referred to hereinafter as poly(tetrafluoroethylene-g-styrene). When the polystyrene is substituted, for example with a nitro group, the product will be referred to hereinafter as for example poly(tetrafluoroethylene-g-nitro styrene).

By multiplicity of mer units as defined we mean that polymeric graft chains are formed; their chain length is not critical; it can be controlled in a manner known per se and both short and long graft-chains are useful.

Methods of preparing the graft copolymers, into which the protein-reactive group is to be introduced e.g. methods of preparing polystyrene grafts on polythene, polypropylene, polytetrafluoroethylene, etc. are known e.g. from B.P. 801,528. Our preferred method is to graft-polymerise in the presence of ionising radiation as understood in the art; this term includes (B.P. 801,528, p. 1, lines 49–56) "β-rays, γ-rays, neutrons, accelerated electrons and heavy particles, X-rays, etc. or mixture of them. Convenient sources for such radiation may be furnished by atomic piles, electron or particle accelerators, radioactive isotopes and X-ray equipment." The polymerisation may be carried out by all the methods known e.g. in a liquid medium, using an excess of monomer to be grafted-on or an inert liquid for example methanol as cited in Journal of Applied Polymer Science 7, 245–250 (1963); or by coating the trunk polymer with a film of the co-mer; or by reacting the trunk polymer with a vaporized co-mer. Graft copolymers with high concentrations of the protein-reactive substitutents on the surface are preferable; such copolymers exhibit high reactivity and reaction rate and retain the characteristics of the trunk polymer substrate. Consequently the trunk polymer is selected to provide the properties required for the application e.g. inertness to reaction medium, biological acceptability, stability and strength.

Reaction conditions favoring surface grafting are preferred: absence of solvents; alternatively the use of liquid media which are non-solvents for the trunk polymer; the use of co-mers in which trunk polymer is not soluble; and trunk polymers which are resistant to the penetration of the liquid or gaseous co-mer and to any solvent used such as polymers which have been insolubilised by cross-linking or inert polymers, particularly polytetrafluoroethylene (P.T.F.E.), are preferred.

Chapiro (J. Polymer Sci., 34 481 [1959]) has already, established that for the system P.T.F.E.-styrene at high radiation dose-rates surface-grafting predominates whereas stepwise grafting which penetrates gradually into the polymer occurs at low dose-rates. Operation at dose-rates above 3600 up to 300,000 rad/hr. is therefore preferred.

We also provide a process of producing graft copolymers carrying protein-reactive groups as defined above which comprises graft polymerising a vinyl compound of the formula

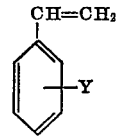

wherein Y is one or more optional substituent which is non-protein-reactive, on to the surface of a solid polymeric backbone and introducing into aromatic groups of said graft copolymer maintained in its solid state a protein-reactive group as defined above. When the protein-reactive group is isothiocyanato, the preferred process of forming it comprises three steps namely; firstly nitrating a multiplicity of phenyl groups in the solid graft copolymer to form the insoluble nitro derivative; secondly, reducing at least part of said nitro groups to amino groups and thirdly reacting the amino group with thiophosgene. The liquid nitration step of styrene homopolymer is known and, according to the prior art (Zenftman, J. Chem. Soc. 1950, 982 and B.P. 616,453) can be carried out successfully only if the polymer is dissolved in the nitration medium and subsequently recovered from solution. In contradistinction we prefer to nitrate the graft polymer in its solid state, e.g. in the predetermined shape of its ultimate use, say in tablet or pellet form; we have found that up to 100% mononitration of the polystyrene grafts can be achieved in this manner, a small degree of polynitration whilst not desirable can be tolerated; formation of all of the nitro groups on the surface and the ease of direct nitration of the solid article is a distinct advantage of our invention. Nitration conditions are as known. Thus the nitration mixture may be a mixture of concentrated nitric acid and concentrated sulphuric acid at a volume ratio from 3:1 to 2:1. Temperatures of nitration may be from −10° C. to 65° C.; the period of nitration is from ½ to 5 hours, preferably from 2 to 4 hours. Alternatively nitration of the graft polymer may be effected in organic solvents e.g. nitromethane, acetic anhydride, acetic acid and chloroform with nitric acid in excess.

The reduction of the nitro gorups obtained to amino groups may be effected by known reducing agents, but again reduction of the solid, undissolved polymer is preferred. Thus e.g. a nitrated graft copolymer, in its solid form, is treated with a mixture of tin and hydrochloric acid at temperatures ranging from about 0° C. to about 100° C. until at least part of, but preferably substantially all of the nitro groups are reduced to amino groups. Since the amino compound tends to discolour we prefer that the reaction be performed in the substantial absence of air; for this reason it may be conveniently left in the form of its salt, for example the hydrochloride, in the solution in which it was prepared.

The conversion of the amino groups to the isothiocyanato groups by reaction with thiophosgene may be carried out in analogy to the reaction with non-polymeric compounds at ambient temperatures, preferably between 0° C. and 30° C. in water, in the presence of an acid acceptor. However, in water the reaction rate with our solid amino graft copolymer is slow, even if a chlorinated solvent for example carbon tetrachloride is added. We have found that the conversion is much faster, and this is our preferred process of forming the isocyanate derivative, if the amino-substituted graft copolymer or a salt thereof is suspended as a solid in a solvent capable of causing the surface of the copolymer to swell, preferably a chlorinated hydrocarbon solvent such as carbon tetrachloride, optionally in the presence of a basic acid binding agent, for example sodium bicarbonate, calcium carbonate or sodium hydroxide, and thiophosgene is added under stirring, at ambient temperature, preferably between 0 and 30° C. The time of reaction is up to 24 hours. The resultant isothicyanate graft copolymer may be washed with solvents such as for example carbon tetrachloride, chloroform, diethyl ether or solvent mixtures and dried in a vacuum oven at temperatures below the decomposition temeprature of the isothiocyanate graft copolymer preferably not in excess of 60° C.

Alternatively the amino groups of our graft copolymers may be converted to isothiocyanate groups by reaction with carbon disulphide in the presence of a hydroxide of an alkali metal followed by further reaction with an alkylchloroformate, as exemplified below with ethyl-chloroformate according to the schematic equations $$R—NH_2 + CS_2 + NaOH \rightarrow R—NH—CSSNa$$

and $$R—NH—CSSNa + Cl—COO—C_2H_5 \rightarrow$$
$$R—NCS + C_2H_5OH + COS + NaCl$$

where R is one unit of the residue of a graft copolymer and the reaction of only one of a multiplicity of groups is indicated. Alternatively in place of the alkyl-chloroformate in the second reaction a haloite of an alkali metal, e.g. $NaClO_2$ or $NaClO$ may be used.

Another process of introducing a protein-reactive group comprises chloromethylating a graft copolymer in the presence of a solvent capable of causing the grafted chains to swell, e.g. chloroform. The process of chloromethylation by reaction with a chloromethylether, e.g. chloromethyl methylether or chloromethylethylether, or with formaldehyde and hydrogen chloride in the presence of a catalyst such as zinc chloride or aluminium chloride is known per se, e.g. from Fieser and Fieser, Advanced Organic Chemistry, N.Y., Reinhold Co., 1961 edition, pp. 778–80. We prefer stannic chloride as the catalyst.

Optionally this polymer may be nitrated. The bonding of these chloromethyl groups to proteins is analogous to the process described by Merrified, cited above.

Yet another process of introducing a group, which is protein-reactive in combination with a carbodiimide, comprises introducing a linking group —LNHR" into the ring of the grafted-on polystyrene. One such process is the reaction of an alkyleneimine with grafted-on poly(aminostyrene) according to the schematic reaction

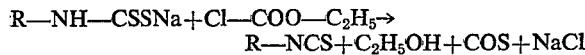

wherein Q symbolises the residue of the graft-copolymer, the reaction of only one of a multiplicity of groups is indicated and R" is as above defined. The reaction in which the linking group may be coupled by the carbodiimide to amino acids, peptides and proteins is known, e.g. from Sheehan et al., J.A.C.S. 77, 1067 (1955).

Yet another process of introducing a protein-reactive group comprises diazotising a solid polyamino-styrene graft copolymer according to this invention in a manner known per se to form the diazonium salt of a strong acid. This may then be attached to the free amino group of an amino acid, peptide or protein according to the schematic reaction

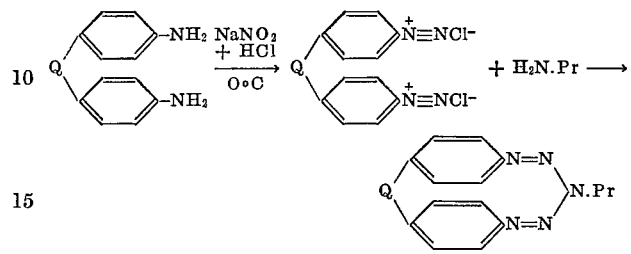

wherein Q is as above defined and Pr is the protein residue.

We also provide a process of reacting our graft copolymers having protein-reactive groups as defined with amino acids, peptides or proteins. We also provide the reaction products of our graft copolymers as defined above with amino group containing compounds, particularly amino acids, peptides and proteins. Our graft copolymers may be used whenever a chemical bond of an amino compound, e.g. an amino acid, peptide or protein onto the surface of a plastic material is desired. One such use is the specific separation of proteins from solution as practiced in hormone studies disclosed, e.g. by W. M. Hunter and F. C. Greenwood, Biochem. J. 85, 39P (1963), by R. D. Utiger, M. L. Parker and W. H. Daughaday, J. Clin. Invest. 41, 254 (1962) and by S. M. Glick, J. Roth, R. S. Yalow and S. A. Berson, Nature 199, 784 (1963) or for the assay on insulin described, e.g. by R. S. Yalow and S. A. Berson, J. Clin. Invest. 39P, 1157 (1960).

Another possible use lies in the synthesis of peptides according to Merrifield cited above. Quantitative reaction in organic protein analysis generally is a further application.

A further application is in prosthesis. The use of plastic materials, e.g. nylon or polytetrafluoroethylene in medical prosthesis is not always possible because these materials are not entirely compatible with the body tissue. We envisage that a dense surface layer of protein bonded onto our copolymers will improve the compatibility of plastic prosthesis with mammalian body tissue.

The surface reactivity of our graft copolymers is advantageous. It increases the rate of reaction, ease of separation by filtration, prevents undesired reactions in the body of the plastic where the completed proteins would not be readily available for any further reaction, e.g. with other proteins; as the grafted-on polymer is insolubilised by the grafting process any unwanted homopolymerised polystyrene is readily removed by a solvent wash.

Positioning of virtually all of the reactive groups on the surface makes it also possible to prefabricate plastic articles, e.g. semipermeable membranes, reactive diaphragms, pellets, crucibles, filters and synthetic body implants with reactive surfaces ready for reaction with proteins or alternatively with built-in chemically bonded surfaces of proteins.

The invention is illustrated by, but not limited to the following examples in which all parts and percentages are expressed by weight unless otherwise stated.

EXAMPLE 1

Polytetrafluorethylene powder, Fluon G.4 (registered trademark) (250 gm.) was sieved through a British Standard Specification 10 mesh sieve and transferred to a 2000 ml. cylindrical glass reaction vessel. Styrene monomer (500 ml.) which hade been distilled under reduced pressure in an atmosphere of nitrogen was added to the polytetrafluoroethylene and the mixture was freeze degassed three times at a pressure of 0.01 mm. Hg using liquid nitrogen as the coolant. The reaction vessel was placed at the centre of a circular arrangement of eight 250 curie Cobalt⁶⁰ γ-emitter radiation sources. Irradiation was carried out at ambient temperature for three hours during which the dose rate in the reaction vessel was maintained at $1.75 \times 10^5$ rads per hour. The reaction mixture was then filtered and washed with hot benzene until free of homopolymerized styrene. The weight of the irradiated product (after drying in vacuo at 60° C.) was 269.8 gm., equivalent to a graft of polystyrene of 7.3%. The presence of polystyrene in the graft copolymer was determined by infra red spectroscopy. The poly(tetrafluoroethylene-g-styrene) was wettable with water only with difficulty and small particles continued to float on water for considerable time, in spite of a specific gravity greater than 2.2. This example produced predominantly a surface graft according to Chapiro, cited above, which we prefer as intermediates for our copolymer. It demonstrates the high degree of surface grafting attainable at fast rates when high irradiation dose rates are used.

EXAMPLE 2

Example 1 was repeated except that the dose rate in the reaction vessel was reduced to 940 rads per hour and the irradiation time was increased to 35 hours. The weight of the irradiated product was 264.6 gm., equivalent to a graft of polystyrene of 5.5%. The presence of polystyrene in the graft copolymer was determined by infra red spectroscopy. This example illustrates the effect obtained with irradiation at low dose rates. The poly(tetrafluoroethylene-g-styrene) was wettable with water only with difficulty.

This example demonstrates a predominantly homogeneous (depth) graft copolymer.

EXAMPLE 3

Concentrated nitric acid 69.7% (262 ml.) and concentrated sulphuric acid 96% (98 ml.) were mixed, and the mixture placed in a 2,000 ml. flask fitted with a stirrer and thermometer. The flask was placed in an ice bath, the contents thereof cooled to 0° C., and portions of the poly(tetrafluoroethylene-g-styrene) obtained in Example 1 were slowly added to the stirred acid mixture until 150.6 gm. of copolymer had been dispersed in the acid mixture. The dispersion was stirred for a further 30 minutes at 0° C., after which its temperature was allowed to rise to about 20° C. and stirring at that temperature was continued for a further 30 minutes. The dispersion was then heated to about 50° C. and stirring continued for a further 1½ hours. A further 180 ml. of the nitric acid-sulphuric acid mixture referred to above was added to the dispersion and stirring continued for a further 1½ hours at a temperature of about 50° C. The contents of the flask were cooled, filtered and the solid product retained on the filter was washed with distilled water to remove acidity, then with methanol, and finally dried in a vacuum oven at 60° C. The poly(tetrafluoroethylene-g-nitrostyrene) thus obtained was pale yellow in appearance, and its colour darkened upon exposure to sunlight. The weight of product obtained was 155.6 gm. The weight increase indicated that about one nitro group had been introduced per aromatic ring present in the graft copolymer with a small proportion of the aromatic rings being polynitrated. The poly(tetrafluoroethylene-g-nitrostyrene) was easily wetted with water. The presence of aromatic nitro groups in the product was confirmed by infra red spectroscopy.

EXAMPLE 4

Example 3 was repeated except that the graft copolymer from Example 1 was replaced by 150.6 gm. of the poly(tetrafluoromethylene-g-styrene) from Example 2. The weight of the product obtained was 154.0 gm., and the weight increase indicated that the introduction of one nitro group per aromatic ring present in the graft had been substantially achieved. The poly(tetrafluoroethylene-g-nitrostyrene) was easily wetted with water. The presence of aromatic nitro groups in the product was confirmed by infra red spectroscopy.

EXAMPLE 5

Powdered tin (180 gm.) was washed free of grease with diethyl ether, dried and mixed with the poly(tetrafluoroethyle-g-nitrostyrene) from Example 3 (100 gm.) in a 2,000 ml. flask fitted with a stirring device and a condenser. Concentrated hydrochloric acid 35% (400 ml.) was slowly added to the contents of the flask which were stirred during the acid addition. The contents of the flask were heated to about 100° C., and maintained in a stirred condition for 4 hours at this temperature. A further 200 ml. of concentrated hydrochloric acid was added to the contents of the flask and heating at about 100° C. continued for a further 2 hours. The contents of the flask were then cooled to ambient temperature and stirring continued for a further 16 hours. The reaction mixture was then filtered and the resultant solids washed free of chloride with distilled water. The product which was off white in colour, was treated with a solution of 50 g. sodium hydroxide in 100 ml. of water whereupon the colour of the product changed to a pink shade. The residual solids were filtered, washed thoroughly with distilled water till the washings were neutral then twice with methanol and dried in vacuo at 60° C. The yield of dried product was 98.1 gm. The change from the original weight indicated that substantially all of the nitro groups had been converted to amino groups. The presence of aromatic groups in the graft copolymer was confirmed by infrared spectroscopy. The poly(tetrafluoroethylene-g-amino styrene) was wetted easily with water.

EXAMPLE 6

Example 5 was repeated except that (a) the poly(tetrafluoroethylene-g-nitrostyrene) from Example 3 was replaced by the poly(tetrafluoroethylene-g-nitrostyrene) of Example 4, and (b) the resultant compound was left as the hydrochloride salt of the amino graft copolymer. Similar conversions of nitro to amino groups to those obtained in Example 5 were obtained. The hydrochloride salt of the poly(tetrafluoroethylene-g-aminostyrene) was wetted easily with water.

EXAMPLE 7

The poly(tetrafluoroethylene-g-aminostyrene) from Example 5 (50 g.) and sodium bicarbonate (22.1 g.) were suspended in carbon tetrachloride (150 ml.) in a 2,000 ml. flask and the mixture was stirred vigorously at about 20° C. Thiophosgene (10.0 ml.) was added dropwise to the mixture over a period of 10 minutes, and stirring was continued for 16 hours. The reaction mixture was then filtered and the resultant solids were then washed with carbon tetrachloride, followed by 2 washes with a mixture containing equa volumes of carbon tetrachloride and diethylether. Four further washings were then carried out with mixtures of carbon tetrachloride and diethyl ether, each successive washing mixture containing a larger proportion of diethylether, until the final washing liquid was pure diethylether. The washed product was dried in vacuo at about 60° C., washed with hot water several times and finally dried in vacuo at about 60° C. The final weight of the isothiocyanato graft copolymer was 51.1 g., indicating that the bulk of the original amino groups had been converted to isothiocyanato groups. The poly(tetrafluoroethylene-g-isothiocyanatostyrene) was light purple in shade. The presence of isothiocyaato groups and the absence of amino groups in the graft coplymer was confirmed by infrared spectroscopy.

EXAMPLE 8

Example 7 was repeated but the poly(tetrafluoroethylene-g-amino styrene) from Example 5 was replaced by the hydrochloride salt of the poly(tetrafluoroethylene-g-amino styrene) of Example 6 and additional sodium bicarbonate was added to the suspension to convert the hydrochloride salt to the amino groft copolymer in situ before adding the thiophosgene. An approximately equal degree of conversion to that obtained in Example 7 was obtained. The final reaction product had a creamy appearance. The presence of isothiocyanato groups was confirmed by infra-red spectroscopy.

EXAMPLE 9

This example demonstrates graft polymerisation of intermediates to our compounds with the monomer in solution.

Polytetrafluoroethylene powder "Fluon" G4" was sieved through a British Standard Specification 10 mesh sieve and 35.36 gm. of the powder passing through the sieve was transferred to a 250 ml. round-bottomed flask. Styrene monomer (commercial grade) (60.0 ml.) was dissolved in benzene (20.0 ml.), the solution added to the polymer and the mixture freeze-degassed three times at a pressure of 0.01 mm. Hg using liquid nitrogen as coolant. The reaction vessel was placed at the centre of a circular arrangement of eight 250 curie $Co^{60}$ $\gamma$-emitter radiation sources. Irradiation was performed at ambient temperature for 3 hours during which the dose-rate in the reaction vessel was maintained at $1.75 \times 10^5$ rads per hour. The reaction mixture was then filtered and the residual solids washed with hot benzene until free of homopolymerised styrene. The weight of the irradiated product was 37.14 gm. indicating the presence of 4.81% grafted polystyrene. There was thus obtained poly(tetrafluoroethylene-g-styrene) suitable for conversion to poly(tetrafluoroethylene-g-isothiocyanate styrene).

EXAMPLE 10

The following example demonstrates the preparation of poly(propylene-g-styrene) in the form of a shaped article.

A shaped article of poly(propylene) in the form of a 100 ml. beaker (19.29 gm.) was immersed in a mixture of styrene monomer (200 ml.) and methanol (200 ml.) in a 1-litre wide-necked flask. The flask and contents were purged with oxygen-free nitrogen for 30 minutes at room temperature with the gas inlet tube arranged so as to keep the beaker fully immersed in the monomer solution. The reaction flask was then sealed and placed at the centre of a circular arangement of eight 250 Curie $Co^{60}$ $\gamma$-emitter radiation sources. Irradiation was performed at room temperature for 2 hours during which the dose-rate in the reaction flask was maintained at $1.75 \times 10^5$ rads/hr. The beaker was then removed from the flask, continuously washed with benzene until free of homopolymer and dried in vacuo.

The final weight of the irradiated beaker (20.35 gm.) indicated the presence of 5.21% grafted polystyene. Infra-red spectroscopy of a small section cut from the beaker confirmed the presence of grafted polystyrene.

There was thus obtained poly(propylene-g-styrene) in shaped form.

EXAMPLE 11

The poly(propylene-g-styrene) beaker obtained from Example 10 was nitrated according to the conditions of Example 29 except that the grafted beaker itself was used as the reaction vessel. There was thus obtained a shaped article in the form of a beaker having poly(propylene-g-nitro styrene) as its inner surface suitable for conversion to a shaped article having poly(propylene-g-isothiocyanato styrene) as its inner surface using for example reaction conditions anologous to those described in Examples 30 and 31.

EXAMPLE 12

Poly(ethylene-g-styrene) beads ("Rigidex" polyethylene [registered trademark] 16.17% grafted polystyrene) obtained by conditions analogous to those described in Example 28 were nitrated, reduced and reacted with thiophosgene according to the conditions of Examples 29, 30 and 31. Infra-red spectroscopy indicated the presence of strong isothiocyanate bands at 2050 cm.$^{-1}$ and 920 cm.$^{-1}$.

There was thus obtained poly(ethylene-g-isothiocyanato styrene) in the form of small beads.

EXAMPLE 13

Nitrogen gas was bubbled through two gas wash-bottles each containing a styrene monomer/water mixture (200 ml., 1:1). The wash-bottles and contents were kept at 50° C. by immersion in a water-bath. The styrene/water saturated nitrogen was then passed through a fluidised bed reactor containing poly(tetrafluoroethylene) powder (103.02 gm.). The system was fluidised for 1 hour at room temperature and then while fluidisation still continued the reactor and fluidised contents were irradiated with $\gamma$-rays from a $Co^{60}$ source at a dose-rate of $1.7 \times 10^5$ rads/hr. for 6 hours. During the irradiation the reactor and contents was maintained at a temperature of 60–65° C.

After irradiation the resultant polymer was washed thoroughly with hot benzene until free of homopolymer and dried in vacuo at 65° C. The final weight of the dried polymer (104.51 g.) indicated the presence of 1.43% grafted polystyrene. The presence of polystyrene in the polymer was confirmed by infra-red spectroscopy. The poly(tetrafluoroethylene - g - styrene) thus obtained was then nitrated, reduced and reacted with thiophosgene as described in Examples 3, 5 and 7 to form poly(tetrafluoroethylene-g-isothiocyanato styrene).

EXAMPLE 14

This example describes the graft polymerisation in aqueous dispersion. A polytetrafluorothylene dispersion in water, "Fluon" GP1 (registered trademark), (100.0 mls., containing 85.19 g. polymer) was diluted with distilled water (100.0 mls.) and styrene monomer (10.0 mls.), which had been purified by distillation, added. The mixture was gently agitated to emulsify the monomer and allowed to stand at room temperature overnight. The flask was fitted with a condenser, the contents warmed to about 70° C., and maintained at this temperature for 6 hours during which time the contents of the flask were submitted to irradiation from a $Cobalt^{60}$ $\gamma$-emitter radiation source in such a manner that the dose-rate in the flask was maintained at $1.75 \times 10^5$ rads per hour. After irradiation had been completed the contents of the flask were poured into stirred boiling methanol. The resultant solids were then separated from the mixture by filtration, and the solids were then washed free of homopolymerised styrene using hot benzene as the washing medium. The resultant graft copolymer was dried in vacuo at 60° C. to yield 87.65 gm. of product corresponding to a graft of 2.81% polystyrene. The presence of polystyrene in the graft copolymer was confirmed by infra-red analysis. The poly(tetrafluoroethylene-g-styrene) so obtained was then nitrated, reduced and reacted with thiophosgene as described in Examples 3, 5 and 7 to form poly(tetrafluoroethylene-g-isothiocyanato styrene).

EXAMPLE 15

This example illustrates a means whereby the polymers according to our invention may be used in an analytical procedure involving proteinaceous substances.

25 mgrm. of anti-human-growth-hormone-rabbit-gamma-globulin in 0.5 ml. of 0.05 normal sodium hydroxide solution was made up to 10.0 ml. with pH 9.6 bicarbonate buffer solution. This solution was added to 2.0 gm. of poly(tetrafluoroethylene-g-isothiocyanato styrene) in a small glass vial and the mixture shaken for 24 hours at room temperature. The antibody bound polymer was then filtered and washed thoroughly with normal saline solution. 5 mg. of the above solid antibody bound polymer was incubated for 12 hours with 0.2 m$\mu$g. of human growth hormone $^{131}$I in the presence of increasing quantities of unlabelled human growth hormone. There was thus obtained a method for the preparation of a standard curve for use in determining the level of human growth hormone.

EXAMPLE 16

This example demonstrates the introduction of protein reactive chloromethyl groups into the graft copolymer.

Poly(tetrafluoroethylene-g-styrene) (surface graft, polystyrene=7.34%) (50.0 gm.) was stirred in chloroform (300 ml.) in a 3-necked, one litre flask at 30° C. for 1 hour. The suspension was then cooled to 0° C. by means of an ice bath. Chloromethyl methyl ether (50.0 ml.) and stannic chloride (7.5 ml.) previously cooled to 0° C. were then slowly added to the vigorously stirred copolymer suspension. The temperature rose to 15° C. during the addition. The mixture was then cooled to 0° C. and stirred at 0° C. for a further 40 mins.

After filtering, the polymer was washed with one litre of a dioxane water mixture (3:1) then with one litre of a dioxane/3 N hydrochloric acid mixture (3:1) and then with dioxane-methyl alcohol mixtures of decreasing concentration in dioxane until the polymer was finally washed with pure methanol. The poly(tetrafluoroethylene-g-chloromethyl styrene) (white in colour) was then dried in vacuo at 60° C. The final weight of copolymer was 50.37 gms. which corresponds to 22% chloromethyl substitution.

EXAMPLE 17

This example demonstrates the introduction of protein reactive nitro-chloromethylated groups into the graft copolymer.

Poly(tetrafluoroethylene-g-strene) (surface graft; polystyrene 5.44% (50.03 grams.) was chloromethylated according to the method described in Example 16. The final weight of copolymer was 50.31 gms. This corresponds to 22% chloromethyl substitution.

Fuming nitric acid (SG 1.510, 96% HNO₃) (500 ml.) was stirred in a 2 litre flask at 0° C. The above chloromethylated polymer (49.84 gm.) was slowly added to the stirred nitric acid keeping the temperature at 0° C. When addition was complete the mixture was stirred for 1 hour at 0° C., the polymer was then filtered off and washed with water until neutral. The product was given a final wash with methanol and dried in vacuo at 60° C. The poly(tetrafluoroethylene-g-nitrochloromethyl styrene) was light yellow in colour. The final weight of polymer was 50.95 gms. which corresponds to approximately one nitro group substitution per aromatic ring.

This copolymer is particularly suitable for synthesis of proteins where it is desirable to selectively cleave the peptide initially linked to the solid phase from it at the completion of the reaction.

EXAMPLE 18

This example demonstrates the introduction of protein-reactive chloromethyl groups into the graft copolymer. Experiments carried out with our graft copolymers using the technique described by Merrifield cited above to introduce the chloromethyl group into the grafted resin resulted in only partial substitution (22% of theoretical). 100% monosubstitution of the —CH₂Cl group into the polystyrene graft is possible according to the following procedure.

Poly(tetrafluoroethylene-g-styrene) (50.0 gm.) containing 2.72 gm. grafted polystyrene was placed in a 3 necked, 500 ml. round bottomed flask fitted with a stirrer, thermometer and condenser. Chloromethyl methyl ether (100 ml.) was adde and the mixture stirred for 1 hour at room temperature. To the stirred mixture was slowly added anhydrous stannic chloride (3.0 ml.) in chloromethyl methyl ether (20.0 ml.).

The flask was then slowly warmed to 60° C. until reflux commenced. The mixture was stirred under reflux for 1½ hours or until the polymer showed signs of turning a pinkish colour. After cooling, the mixture was filtered and washed with aqueous dioxan, then aqueous dioxan containing 10% v./v. of concentrated hydrochloric acid, and finally with pure dioxan. Washing was continued using dioxan/methanol mixtures of decreasing dioxan content until the polymer was finally washed with pure methanol. The poly(tetrafluoroethylene-g-chloromethyl styrene) of a pale yellow colour, was dried in vacuo at 60° C.

|  | Gm. |
|---|---|
| Initial weight of polymer | 50.00 |
| Final weight after drying | 51.50 | i.e. the polymer contained 3% —CH₂Cl or 0.605 millimole of —CH₂Cl/gm.

EXAMPLE 19

This example demonstrates the introduction of a linking group —LNHR" according to our invention which, in combination with carbodiimides, is capable of binding proteins.

Tetralin was purified by drying over sodium wire. The tetralin was then distilled over sodium wire in apparatus protected from atmospheric moisture with CaCl₂ drying tubes. The fraction boiling at 206–207° C. was collected.

All apparatus used in the preparation was carefully dried to ensure anhydrous conditions.

"Analar" anhydrous aluminum chloride (15.60 gm.) in dry tetralin (300 ml.) was placed in the reaction vessel and the mixture stirred. Poly(tetrafluoroethylene-g-amino styrene) 100.0 gm. (1.25% NH₂ groups i.e. 1.25 gm. or 0.0781 mole-NH₂) was then added slowly. When addition was complete the mixture was heated to 175–180° C. During the heat up, dry oxygen-free nitrogen was bubbled through the reaction mixture. When the temperature of the mixture reached 175–180° C. heating was ceased and ethylenimine vapour (obtained by warming a small vessel containing 5.0 ml. ethylenimine) was introduced into the nitrogen steam. Addition took approximately 30 minutes, after which the mixture was stirred for a further 30 minutes. After cooling to room temperature the mixture was transferred to a 3-necked 3 l. flask fitted with a stirrer and reflux condenser. The flask was cooled to 0° C. and 500 ml. of ice-water mixture slowly added followed by 60 gm. of potassium hydroxide. The polymer was then filtered, washed with water until neutral, then washed several times with alcohol, extracted with hot dioxan in a Soxhlet extractor for 24 hours and finally dried in vacuo at about 60° C. The final weight of the polymer (102.1 g.) indicated that reaction had occurred. The presence of primary and secondary amine groups in the polymer was confirmed by infra-red spectroscopy. There was thus obtained poly(tetrafluoroethylene-g-N-[2 - aminoethyl]amino styrene) capable of binding proteins when used in conjunction with a carbodiimide.

EXAMPLE 20

(a) This example demonstrates the coupling of an enzyme to a shaped article of poly(tetrafluoroethylene-g-styrene diazonium chloride) with retention of enzymatic activity.

Fifteen poly(tetrafluoroethylene-g-amino styrene) discs of total weight 1.0 g. (0.6%-NH₂ groups), obtained by reaction conditions analogous to those described in Example 30, where suspended in 1 N hydrochloric acid (40.0 ml.) and cooled to 0–4° C. A solution of sodium nitrite (40%, 4.0 ml.) was then added slowly with stirring keeping the temperature below 4° C. The mixture was then stirred for 4 hours at 4° C. and the discs then washed several times with 10⁻³ N hydrochloric acid. There was thus obtained poly(tetrafluoroethylene-g-styrene diazonium chloride) in shaped form. The enzyme trypsin (30 mgm.) was then added to the discs (suspended in approximately 20 ml. 10⁻³ N hydrochloric acid) and the pH of the system raised to pH 7.6 by the addition of phosphate buffer. The mixture was then kept at 4° C. for 16 hours during which time they became a reddish brown colour. Excess enzyme was then removed by washing the discs several times with $10^{-3}$ N hydrochloric acid and a suspension of beta-naphthol (30.0 ml. of 1 g./l at pH 6.4) added to neutralise excess diazonium groups. After standing for 4 hours the excess beta-naphthol was washed from the discs with $10^{-3}$ N hydrochloric acid. The discs was finally placed in a refrigerated filtration unit and washed with 1 litre of $10^{-3}$ N hydrochloric acid over a 24 hour period.

The enzyme-coupled discs were assayed by measuring their proteolytic activity on casein using the method of Bergmeyer in "Methods of Enzymatic Analysis", Academic Press, pages 800–802 The results indicated that about 0.16 μgm. of trypsin had been coupled per disc with full retention of enzymatic activity.

(b) Example 20(a) was repeated except that the enzyme chymotrypsin was coupled to the poly(tetrafluoroethylene-g-styrene diazonium chloride) discs.

Assay results indicated that about 0.36 μgm. of chymotrypsin had been coupled per disc with full retention of enzymatic activity.

EXAMPLE 21

This example demonstrates a process of introducing an isothiocyanato group into our graft copolymer.

Poly(tetrafluoroethylene - g - amino styrene) (percent $NH_2 = 1.25\%$) (50.0 gm.) was stirred in dioxan) 200 ml.) in a 1 litre 3-necked flask for 1 hour at room temperature to swell the polymer. A mixture of NaOH (1.58 g.) in $H_2O$ (6.0 ml.) and carbon disulphide (2.38 ml.) in dioxan (6.0 ml.) was added to the polymer suspension and the mixture stirred for a further 1½ hours at 20° C. Ethyl chloroformate (3.76 ml.) was then added, the mixture stirred for ¼ hour at 25° C., then heated to reflux for 1½ hours.

After cooling to room temperature, the polymer was filtered off and washed with dioxan then with a dioxan/water mixture (3:1) until washings were free of chloride, then with the dioxan/ether mixture (1:1) and finally with ether alone. The product, a light brown in colour, was then dried in vacuo at 60° C.

Final weight of polymer = 51.82 gm.

Analysis of the polymer showed that the product contained about 60% of the theoretical number of isothiocyanato groups.

EXAMPLE 22

This example demonstrates the preparation of our graft copolymers in shaped form. Polytetrafluoroethylene powder ("Fluon" G.4) (1.5 gm.) was placed in the die cavity of a commercially available tablet making machine and submitted to a pressure of 1,500 lb./sq. in. for 1 minute at ambient temperature. The compressed powder was removed from the die cavity and placed in an oven, maintained at a temperature of 380° C., for 1 hour. After cooling to ambient temperature, the resultant cylindrical tablet, which had a diameter of 12 mm. and a height of 7.3 mm. was then treated as described in Examples 28, 29, 30 and 31 so that poly(tetrafluoroethylene-g-isothiocyanato styrene) was formed. The resultant graft copolymer was in a shaped form having essentially similar dimensions to that of the pressed and sintered tablet of polytetrafluoroethylene formed as described above.

EXAMPLE 23

Example 22 was repeated except that instead of forming a tablet from polytetrafluoroethylene powder, a tablet was formed from a solid rod of polytetrafluoroethylene having a diameter of 12 mm. by cutting from the rod a length of 10 mm. There was thus obtained poly(tetrafluoroethylene-g-isothiocyanato styrene) in shaped form.

EXAMPLE 24

Example 22 was repeated except that instead of forming a tablet from polytetrafluoroethylene powder, a shaped article was formed by cutting from a hollow tube of polytetrafluoroethylene having an internal diameter of 7 mm. and having a wall thickness of 1.5 mm., a length of 10 mm. There was thus obtained poly(tetrafluoroethylene-g-isothiocyanato styrene) in shaped form.

EXAMPLE 25

This example demonstrates the preparation of our graft copolymers in a porous shaped form. Polytetrafluoroethylene ("Fluon" G.4) powder was sieved through a 30 BSS sieve. Polymethyl methacrylate ("Diakon" M.G. registered trademark) powder was sieved to break down compacted lumps. Equal weights of the sieved powders were placed in a mixing vessel so as to occupy ⅓ of its volume and the mixing vessel was turned end over end at 30 r.p.m. for 15 minutes. The powder mixture (25 gm.) was placed in the die cavity of a commercially available tablet making machine and submitted to a pressure of 1,500 lb./sq. in. for 1 minute at ambient temperature. The compressed powder was removed from the die cavity and placed in an oven, maintained at a temperature of 380° C. for 90 minutes. The sintered porous shaped article was then removed from the oven and cooled to ambient temperature, and placed in a reactor. Nitrogen gas was bubbled through two gas wash-bottles each containing a styrene monomer/water mixture (200 ml. 1:1). The wash-bottles and contents were kept at 50° C. by immersion in a water bath. The styrene/water saturated nitrogen was then passed into the reactor and directed so that it came into contact with the surfaces of the sintered porous shaped article. The flow of styrene/water saturated nitrogen on to and through the sintered porous shaped article was maintained for one hour, and then continued for a further six hours during which latter period the reactor and its contents were irradiated with γ-rays from a Cobalt[60] source at a dose-rate of $1.7 \times 10^5$ rads/hr. During the irradiation the reactor and its contents were maintained at a temperature of 60–65° C. After irradiation the resultant porous shaped article was washed thoroughly with hot benzene until free of homopolymer and dried in vacuo at 65° C. The final weight of the dried article, 25.30 g., indicated the presence of 1.18% grafted polystyrene. The presence of polystyrene in the porous shaped article was confirmed by infra-red spectroscopy. The poly(tetrafluoroethylene-g-styrene) thus obtained was then treated by the method used in Example 18. There was thus obtained poly(tetrafluoroethylene-g-chloromethyl styrene) in shaped form.

EXAMPLE 26

A strip of 0.002″ thick "Kapton" (registered tradename) polyimide film (157.7 mgm.) was suspended in re-distilled styrene monomer (50.0 ml.) and the mixture freeze-degassed twice in liquid nitrogen to 0.01 mm. Hg. The mixture was irradiated at room temperature for 6 hours at a dose-rate of $1.75 \times 15^5$ rads per hour. After irradiation the film was extracted in boiling benzene for 3 days until free of homopolymer. The film was then dried in vacuo at 65° C. There was no apparent change in the appearance of the irradiated film but the resultant weight (166.2 mgm., representing 5.11% polystyrene) and the infra-red spectrum of the product showed that grafting had occurred.

There was thus obtained a "Kapton" film grafted with polystyrene suitable for conversion to the chloromethyl derivative as described in Example 18.

EXAMPLE 27

A strip of 0.002″ thick "Parylene" C (registered tradename) poly(monochloro-p-xylene) film (197.9 mgm.) was suspended in re-distilled styrene monomer (60.0 ml.) in a 250 ml. reaction vessel and the mixture freeze-degassed twice in liquid nitrogen to a pressure of 0.01 mm. Hg. The reaction vessel and contents were then irradiated at room temperature for 6 hours at a dose-rate of $1.75 \times 10^5$ rads per hour. After irradiation the film was extracted in hot benzene for 3 days until free of homopolymer and finally dried in vacuo at 60° C. for 36 hours. The final weight of the film (292.1 mgm.) indicated that 32.35% polystyrene had graft copolymerised. The presence of grafted polystyrene was confirmed by infra-red spectroscopy.

There was thus obtained poly(monochloro-p-xylylene-g-styrene) film suitable for conversion to poly(monochloro-p-xylylene-g-chloromethyl styrene) as described in Example 18.

EXAMPLE 28

This example demonstrates the preparation of poly (tetrafluoroethylene-g-styrene) in shaped form.

Small discs ½ in. in diameter were punched from 1/1000 in. thick polytetrafluoroethylene tape and washed in boiling benzene. The discs, 200.48 gm., were dried in vacuo and transferred to a 1 litre Pyrex glass reaction vessel fitted with a stirrer and an "inert-gas purge" system. The discs were covered with commercially available inhibited styrene monomer (600 ml.) and the reaction vessel purged with oxygen-free nitrogen for 1 hour. The vessel and contents were then irradiated at room temperature with $Co^{60}$ $\gamma$-rays for 6 hours at a dose-rate of $1.9 \times 10^5$ rads per hour with stirring and nitrogen purge. The resultant discs were then filtered off, washed with benzene, extracted in a Soxhlet apparatus with hot benzene until constant in weight (after 72 hours) and finally dried in vacuo at 60° C. The final weight of the discs (205.21 gm.) indicated the presence 2.33% grafted polystyrene. The presence of polystyrene in the graft copolymer was confirmed by infra-red spectroscopy.

EXAMPLE 29

This example demonstrates the preparation of poly (tetrafluoroethylene-g-nitro styrene) in shaped form.

Concentrated sulphuric acid (224 ml.) and concentrated nitric acid (567 ml.) were mixed in a 1 litre Pyrex reaction vessel and cooled to 0–5° C. and poly(tetrafluoroethylene-g-styrene) discs (203.97 gm.), obtained in Example 28, were added. The mixture was stirred at 0–5° C. for 30 minutes, then at room temperature for 30 minutes, and finally at 50° C. for 3 hours. After cooling, the resultant discs were thoroughly washed with water and then with methanol and dried in vacuo at 60° C. The final weight of the discs (206.03 g.) after nitration indicated that about one nitro group had been introduced per aromatic ring present in the graft copolymer with a small proportion of the aromatic rings being polynitrated. The presence of aromatic nitro groups in the product was confirmed by infra-red spectroscopy.

EXAMPLE 30

This example demonstrates the preparation of poly tetrafluoroethylene-g-amino styrene) in shaped form.

205.05 g. of poly(tetrafluoroethylene-g-nitro styrene) discs obtained in Example 29 were equilibrated in a 1 litre Pyrex reaction vessel in 500 ml. of dioxan for 1 hour at room temperature and powdered tin (25 g.) followed by concentrated hydrochloric acid (170 ml.) added with stirring. The mixture was then heated at reflux temperature for 11 hours. After cooling, the resultant discs were washed thoroughly with dioxan/concentrated HCl mixture (90:10) until free of tin salts, then with dioxan followed by two further washings with ammoniacal dioxan. Dioxan washing was continued until the washings were free of chloride to yield 203.68 g. of product. The change from the original weight indicated that substantially all of the nitro groups had been converted to amino groups. The presence of aromatic amino groups in the graft copolymer was confirmed by infra-red spectroscopy.

EXAMPLE 31

This example demonstrates the preparation of polytetrafluoroethylene-g-isothiocyanato styrene) is shaped form.

Poly(tetrafluoroethylene-amino styrene) discs (203.6 g.) from Example 30 were suspended in dioxan (500 ml.) in a 1 litre reaction vessel for 1 hour. Thiophosgene (7.0 ml.) and water (50.0 ml.) were then added. The mixture was stirred vigorously for 1½ hours at room temperature, the discs were filtered off, washed thoroughly with dioxan/water mixtures until free of chloride, then with pure dioxan and finally dried in vacuo at 60° C. to give 204.15 g. of product. Strong bands at 930 and 2100 cm.$^{-1}$ in the infre-red spectrum of sample discs indicated that substantially all of the amino groups had been converted to isothiocyanate groups. The absence of amino groups in the graft copolymer was also confirmed by infra-red spectroscopy. The poly(tetrafluoroethylene-g-isothiocyanato styrene) discs were a yellow-brown colour.

EXAMPLE 32

The following example demonstrates the preparation of poly(tetrafluoroethylene-g-acetyl amino styrene) in the form of a shaped article.

Poly(tetrafluoroethylene-g-amino styrene) discs from Example 30 (198.53 g.) were charged to a 1 litre Pyrex flask and were suspended in dioxan (300 ml.) and acetic anhydride (10 ml.) was then added. The mixture was stirred and heated in a water-bath at 90° C. for 4 hours. The mixture was then cooled, filtered and the discs washed with dioxan and then with a dioxan/water mixture (1:1) until neutral, and finally with dioxan again. The resultant discs, an orange-red colour, were dried in vacuo at 65° C. for 16 hours.

The final weight of the discs (201.42 g.) indicated that reaction had occurred. The presence of the acetyl group in the graft copolymer was confirmed by infra-red analysis with a strong $>$C=O band at 1650 cm.$^{-1}$. There was thus obtained poly(tetrafluoroethylene-g-acetyl amino styrene) in shaped form.

EXAMPLE 33

This example demonstrates the preparation of poly (tetrafluoroethylene-g-o-nitroacetyl amino styrene) in shaped form.

Fuming nitric acid (350 ml.) was placed in a 500 ml. Pyrex reaction vessel and cooled to $-5°$ C. in an ice/salt bath. Poly(tetrafluoroethylene-g-acetyl amino styrene) discs (168.85 g.) from Example 32 were then added slowly with stirring. The temperature was allowed to rise to 0° C. and kept at this temperature for 1 hour with constant stirring. The mixture was then filtered and the resultant discs washed with water until neutral, then with methanol and finally dried in vacuo for 16 hours. The final weight of the discs was 170.65 g. Infra-red spectra indicated the presence of nitro groups in the copolymer.

There was thus obtained poly(tetrafluoroethylene-g-o-nitro acetyl amino styrene) in shaped form.

EXAMPLE 34

This example demonstrates the preparation of poly (tetrafluoroethylene-g-o-nitro amino styrene) in shaped form.

Dioxan (135 ml.) was placed in a 250 ml. Pyrex reaction vessel and poly(tetrafluoroethylene-g-o-nitro acetyl amino styrene) discs (71.77 gm.) from Example 33 were added slowly and the mixture stirred for 15 minutes at room temperature. Sulphuric acid solution (70%) (45 ml.) was added and the mixture heated to reflux (95° C.) for 3 hours. After cooling to room temperature the resultant discs were filtered and washed with dioxan, water-dioxan mixture, ammoniacal dioxan and finally with water. After a further rinse in methanol the discs were dried for about 16 hours in vacou at 65° C.

The final weight of the discs (red-brown in colour) was 71.17 g. Infre-red spectra confirmed the absence of the acetyl $>$C=O group and the presence of nitro and amino groups in the copolymer.

There was thus obtained poly(tetrafluoroethylene-g-o-nitro amino styrene) in shaped form.

EXAMPLE 35

This example demonstrates the preparation of poly-(tetrafluoroethylene-g-o-nitro isothiocyanato styrene) in shaped form.

Poly(tetrafluoroethylene - g - o - nitro amino styrene) discs from Example 34 (69.90 gm.) were suspended in dioxan (190 ml.) in a 250 ml. Pyrex reaction vessel and the mixture stirred at room temperature for 30 minutes. Thiophosgene (2.7 ml.) was added slowly and stirring continued for a further 30 minutes. Water (30 ml.) was then added in portions over 15 minutes and stirring continued for 1 hour.

After filtering, the resultant discs were washed with water-dioxan mixtures until free of chloride, then washed with pure dioxan. Drying was carried out at 65° C. in vacuo. The final weight of the discs was 70.20 g. Infrared spectra confirmed the presence of isothiocyanato and nitro groups in the compolymer.

There was thus obtained poly(tetrafluoroethylene-g-o-nitro isothiocyanato styrene) in shaped form.

EXAMPLE 36

Poly(tetrafluoroethylene - g - N - [2 - amino ethyl] suspended in dioxan (50.0 ml.) and stirred for 1 hour at room temperature. Thiophosgene (2.0 ml.) was added and the mixture stirred for a further 3 hours. Water (15.0 ml.) was then added, stirring continued for a further ½ hour, the mixture filtered and the polymer washed thoroughly with dioxan and dried in vacuo at 60° C.

The final weight of the polymer (19.12 gm.) indicated that reaction had occurred. The presence of aliphatic isothiocyanato groups was confirmed by infra-red spectroscopy. There was thus obtained poly(tetrafluoroethylene-g-N[2-isothiocyanato ethyl]amino styrene) suitable for use as a protein-reactive polymer.

EXAMPLE 37

This example demonstrates the preparation of poly-(tetrafluoroethylene-g-carboxy styrene) in shaped form.

Poly(tetrafluoroethylene-g-styrene) discs (80.37 gm.) prepared in a manner analogous to that of Example 28 (containing 5.48% grafted polystyrene) were suspended in dry nitrobenzene in a 500 ml. 3-necked flask fitted with a thermometer, a stirrer and a drying tube. Anhydrous aluminium chloride (8.0 gm.) was added, followed by a solution of diphenyl carbamyl chloride (10.0 gm.) in dry nitrobenzene (30.0 ml.). The mixture was heated to 80° C. with stirring whereupon the reaction mixture darkened to a deep blue colour. The reaction mixture was kept at 80–90 C. for 4 hours, cooled, filtered and the discs washed with hydrochloric acid, hydrochloric acid/dioxan mixture, pure dioxan and finally with methanol. The discs, a creamy-yellow colour, were then dried in vacuo at 65° C. The final weight of the polymer (81.19 gm.) indicated that reaction had occurred. The infrared spectra exhibited two new peaks, a wide band at 3400 cm.$^{-1}$ and a sharp band at 1660 cm.$^{-1}$.

The carboxamido discs (74.12 gm.) so formed were then hydrolysed by suspending in a mixture of acetic acid (168.0 ml.), sulphuric acid (125.0 ml.) and water (75.0 ml.) and heated to 135–140° C. with stirring. The reaction mixture was kept at this temperature for 20 hours. The mixture, a dark brown colour, was then cooled and filtered and the discs washed with water, dioxan and finally methanol. The discs, a light green colour, were then dried in vacuo. The final weight of the polymer (73.98 gm.) indicated that reaction had ocurred. Infrared spectroscopy showed that the peaks at 1660 cm.$^{-1}$ and 3400 cm.$^{-1}$ present in the infra-red spectrum of the carboxamido polymer had disappeared. Two new peaks at 1730 cm.$^{-1}$ and 1685 cm.$^{-1}$ confirmed the presence of carboxyl groups in the polymer.

There was thus obtained poly(tetrafluoroethylene-g-carboxy styrene) in shaped form.

EXAMPLE 38

Example 37 was repeated except that the poly(tetrafluoroethylene - g - styrene) discs were replaced by a shaped article of poly(propylene-g-styrene) in the form of a 100 ml. beaker (prepared by the conditions described in Example 10).

There was thus obtained poly(propylene-g-carboxy styrene) in shaped form.

EXAMPLE 39

Example 37 was repeated except that the poly(tetrafluoroethylene - g - styrene) discs were replaced by poly-(ethylene-g-styrene) pellets ("Rigidex" (registered trade mark) polyethylene).

There was thus obtained poly(ethylene-g-carboxy styrene) in shaped form.

EXAMPLE 40

This example demonstrates the coupling of an aminoacid to the polymer in the form of a shaped article.

A poly(tetrafluoroethylene - g - o - nitro isothiocyanato styene) disc for Example 35 was suspended in dioxan (3.0 ml.) and a 10% glycine solution buffered to pH=9.5 (1.0 ml.) was added. The mixture was allowed to stand at room temperature for 48 hours. The disc was then removed from the solution, washed throughly with aqueous dioxan and dried in vacuo at 60° C.

Comparison of infra-red spectra before and after reaction clearly indicated that the strong isothiocyanate peak (at 2500 cm.$^{-1}$) present in the disc before reaction had disappeared and was replaced by a strong band at 3300 cm.$^{-1}$ (—N—H)— and a weaker band at 1600 cm.$^{-1}$ (>C=O). Control experiments carried out without addition of glycine but in solutions of pH up to 10.20 showed no reduction of the isothiocyanate peak, thus indicating that the disappearance of the isothiocyanate peak was not due to hydrolysis.

EXAMPLE 41

This example demonstrates the improved compatability with living tissue.

10 calves aged between 8 and 9 months were confined in separate pens and maintained in a healthy condition for two weeks. Under sterile conditions using sterile equipment 10 ml. of blood was obtained from each calf by venous puncture at the end of this period. The blood was allowed to stand at room temperature for 2 hours in a centrifuge tube and then placed in a refrigerator at 4° C. for 24 hours, after which time the contents of the tube were centrifuged to separate serum therefrom. 5 ml. of the serum so obtained was added to 5 ml. of sterile buffer solution at pH 9.6 The mixture was again centrifuged and the purified serum-buffer solution transferred to a sterile test tube.

Each calf was placed under a general anaesthetic and an operation was performed on the muscle Gluteus Maximus. An incision approximately 3" long was made and two pockets each 1" deep were cut in the muscle about 1" apart. A sterilised disc of polymeric material prepared as described below was placed in each of the pockets and the incision was closed by suturing.

Two types of polymeric disc were used:

(a) 0.5" in diameter and 0.010" in thickness and composed of poly(tetrafluoroethylene);
(b) 0.5" diameter and 0.010" in thickness and composed of poly(tetrafluoroethylene-g-isothiocyanato styrene).

Prior to use the discs were sterilised by steam autoclaving at 115° C. for 2 hours. After sterilisation and prior to insertion into the calf the 20 discs used in the example were sub-divided into four sub-groups as follows:

1.5 discs of poly(tetrafluoroethylene) received no further treatment (control 1);
2.5 discs of poly(tetrafluoroethylene-g-isothiocyanato styrene) received no further treatment (control 2);
3.5 discs of poly(tetrafluoroethylene - g - isothiocyanato styrene) were stored for 16 hours at room temperature in the serum buffer solution obtained from the calf into which the disc was to be inserted (the host calf);

4.5 discs of poly(tetrafluoroethylene - g - isothiocyanato styrene) were stored for 16 hours at room temperature in the serum buffer solution obtained from the host calf and rinsed with sterile saline.

The division described above is set out in Table I.

B=no further treatment of disc
T=treated disc
NR=disc treated with serum buffer solution
R=disc treated with serum buffer solution and saline
a=tissue at side a of disc was examined

TABLE I.—TREATMENT OF DISCS PRIOR TO INSERTION INTO CALVES

| Serial No. of calf and serum | Poly (tetra-fluoroethylene), no further treatment | Poly (tetrafluoroethylene-g-isothiocyanato styrene) | | |
|---|---|---|---|---|
| | | No further treatment | Serum-buffer solution | Serum-buffer solution plus saline |
| 1 | + | | | + |
| 2 | | + | + | + |
| 3 | + | | | + |
| 4 | | + | + | + |
| 5 | + | | | + |
| 6 | | + | + | |
| 7 | + | | | + |
| 8 | | + | + | |
| 9 | + | | | + |
| 10 | | + | + | |

Note: + indicates the treatment given to the disc.

The calves were killed 30 days after treatment, the muscle excised and the samples pathologically examined for foreign body reaction. The tissue at the surfaces of the disc was examined microscopically for fibrosis, macrophages, foreign body giant cells and leucocytes. The reaction to the inserted foreign body was judged by the magnitude of the development of these pathological conditions and scored as set out in Table II.

In Table II the following symbols are used:

—=No observation
(+)=Minimal reaction
+=slight reaction
++=moderate reaction
+++=marked reaction
PTFE=poly(tetrafluoroethylene)
PTFEgIS=poly(tetrafluoroethylene - g - isothiocyanato styrene)
b=tissue at side b—reverse of side a—of disc was examined

TABLE II.—RESULTS OF DISC IMPLANTATION IN CALVES

| Material | Serum No. | | | Fibrosis | Macrophages | F.B. giant cells | Leucocytes | Comment |
|---|---|---|---|---|---|---|---|---|
| PTFE | 1 | B | a | + | + | + | + | Disc in fascia. |
| | | | b | ++ | ++ | + | ++ | |
| PTFEgIS R | | T | a | + | ++ | + | ++ | |
| | | | b | ++ | ++ | + | ++ | |
| PTFEgIS | 2 | B | a | ++ | + | (+) | ++ | |
| | | | b | ++ | + | (+) | ++ | |
| PTFEgIS NR | | T | a | + | (+) | — | + | |
| | | | b | + | + | + | ++ | |
| PTFE | 3 | B | a | ++ | ++ | ++ | +++ | |
| | | | b | ++ | ++ | ++ | +++ | |
| PTFEgIS R | | T | a | ++ | (+) | (+) | + | |
| | | | b | ++ | | | | |
| PTFEgIS | 4 | B | a | + | ++ | + | ++ | |
| | | | b | + | ++ | + | ++ | |
| PTFEgIS NR | | T | a | + | ++ | (+) | + | |
| | | | b | | | (+) | + | |
| PTFE | 5 | B | a | ++ | ++ | + | ++ | Fibrinoid. |
| | | | b | ++ | + | ++ | ++ | |
| PTFEgIS R | | T | a | ++ | + | (+) | (+) | |
| | | | b | ++ | ++ | + | + | |
| PTFEgIS | 6 | B | a | ++ | + | + | + | |
| | | | b | + | + | + | + | |
| PTFEgIS NR | | T | a | | | | | No evaluation because of unsatisfactory sections |
| | | | b | | | | | |
| PTFE | 7 | B | a | ++ | + | ++ | + | Fibrinoid. |
| | | | b | ++ | ++ | + | ++ | |
| PTFEgIS R | | T | a | ++ | ++ | + | ++ | Do. |
| | | | b | + | + | | | |
| PTFEgIS | 8 | B | a | ++ | — | + | (+) | Do. |
| | | | b | ++ | + | + | ++ | |
| PTFEgIS NR | | T | a | — | — | — | (+) | |
| | | | b | — | (+) | — | (+) | |
| PTFE | 9 | B | a | + | — | — | (+) | *. |
| | | | b | +++ | — | — | | |
| PTFEgIS R | | T | a | + | — | — | + | No. macrophages, moderate fibroblastic reaction. |
| | | | b | ++ | — | — | + | |
| PTFEgIS | 10 | B | a | ++ | ++ | ++ | +++ | |
| | | | b | — | + | + | ++ | |
| PTFEgIS NR | | T | a | | | | | No evaluation because of unsatisfactory sections |
| | | | b | | | | | |

*Cystic dilatation. No macrophages but marked fibroblastic reaction with a few multinucleated fibroblasts. Lymphocytic cellular reaction. Fibrinoid necrosis.

Consideration of the results set out in Table II clearly showed that (a) there was less evidence of macrophages and foreign body giant cell reaction in the vicinity of the poly(tetrafluoroethylene-g-isothiocyanato styrene) disc which had received no further treatment after sterilisation than in the vicinity of a similarly untreated polytetrafluoroethylene disc;

(b) there was less evidence of reaction for each of the four parameters used in the vicinity where poly(tetrafluoroethylene-g-isothiocyanato styrene) treated with serum-buffer solution had been inserted than in the vicinity of a similar disc which had received no further treatment after sterilisation prior to implantation;

(c) there was less evidence of reaction for each of the four parameters used in the vicinity where poly(tetrafluoroethylene-g-isothiocyanato styrene) treated with serum-buffer solution had been inserted than in the vicinity of a similar disc which had been treated with serum-buffer solution followed by a saline rinse prior to implantation.

We claim:

1. A polymeric composition comprising the reaction product of (1) a graft copolymer which comprises a polymeric backbone and surface grafted on it polymeric side chains comprising a multiplicity of mer units of the formula

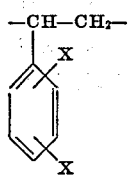

wherein X is a protein-reactive substituent selected from the group consisting of isothiocyanato; the group —LNHR″, L being a nonacidic linking group preserving the basicity of the amino group, and R″ being alkyl and said group —LNHR″ being capable of coupling with the carboxylic acid group of an amino acid or an amino acid terminated peptide or protein by means of the carbodiimide linking reaction; chloromethyl; carboxy and a diazonium salt

wherein Z is the residue of a strong acid and wherein Y stands for at least one optional substituent which is non reactive with proteins, the graft being essentially only on the surface of the polymeric backbone with the virtual absence of reactive groups inside said backbone and (2) amino acid or amino-acid terminated peptide or other protein chemically bonded only to said surface graft through said substituent X.

2. A polymer composition according to claim 1 wherein the polymeric backbone is a polyolefine.

3. A polymer composition according to claim 1 wherein the polymeric backbone is poly(tetrafluoroethylene).

4. A polymer composition according to claim 1 wherein the polymeric backbone is a polyimide.

5. A polymer composition according to claim 1 wherein the polymeric backbone is poly(monochloro-p-xylene).

6. A polymer composition according to claim 1 wherein the protein reactive substituent is isothiocyanato.

7. A polymer composition according to claim 1 wherein the protein-reactive substituent is the group —L.NHR″, L being an alkylene group preserving the basicity of the amino group, R″ being alkyl and said group —L.NHR″ being capable of coupling with the carboxylic acid group of an amino-acid or an amino-acid terminated peptide or protein by means of the carbodiimide linking reaction.

8. A polymer composition according to claim 1 wherein the polymeric backbone is poly(tetrafluoroethylene) and the protein reactive group is a chloromethyl group capable of reacting with the trialkyl-ammonium salt of an amino-acid or an amino-acid terminated peptide or protein to form a methylene ester linkage.

9. A polymer composition according to claim 1 wherein the polymeric backbone is poly(tetrafluoroethylene) and the protein reactive group is a diazonium salt

where Z= is the residue of a strong acid.

10. A polymer composition according to claim 1 where X is isothiocyanato or chloromethyl and Y is a nitro group in the ortho position relative to X.

11. A polymer composition according to claim 1 wherein the backbone is poly(tetrafluoroethylene) and the protein reactive group is a carboxylic acid group.

12. A polymer composition according to claim 1 which is poly(tetrafluoroethylene-g-isothiocyanato styrene).

13. A polymer composition according to claim 1 which is poly(tetrafluoroethylene-g-chloromethyl styrene).

14. A polymer composition according to claim 1 which is poly(tetrafluoroethylene-g-styrene diazonium salts of a strong acid).

15. A polymer composition according to claim 1 which is poly(tetrafluoroethylene-g-[2-aminoethyl]amino styrene).

16. A polymer composition according to claim 1 which is poly(tetrafluoroethylene-g-o-nitroisothiocyanato styrene).

17. A polymer composition according to claim 1 which is poly(tetrafluoroethylene - g - [2 - aminoethyl]amino styrene).

18. A polymer composition according to claim 1 which is poly(tetrafluoroethylene - g - 2 - [isothiocyanato ethyl] amino styrene).

19. An immunochemically active preparation comprising a surface-graft copolymer according to claim 1 and wherein an immunochemically active protein is chemically bonded to said surface graft through the X substituent.

20. A polymer composition comprising (1) a graft copolymer which comprises a polytetrafluoroethylene backbone and surface-grafted on to it polymeric side chains comprising a multiplicity of mer units of the formula

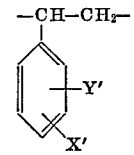

where X′ is nitro-, amino- or acetylamino- and Y′ is H or, whenever X′ is amino- or acetylamino′, a nitro group adjacent to X′, the graft being essentially only on the surface of the polytetrafluoroethylene backbone with the virtual absence of reactive groups inside said backbone and (2) amino acid or amino-acid terminated peptide or other protein chemically bonded to the surface of said graft copolymer through the X substituent.

21. A composition according to claim 1 wherein the mer unit is a substituted styrene.

22. A process comprising graft polymerizing a vinyl aromatic compound of the formula

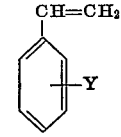

wherein Y stands for at least one optional substituent which is nonreactive with proteins, on to essentially only the surface of a solid shaped, polymeric backbone by carrying out the graft polymerization without dissolving or swelling the polymeric backbone and introducing into the aromatic groups of the resulting surface graft copolymer while it is maintained in its solid state, at least one protein-reactive group X selected from the group consisting of isothiocyanato; —LNHR″ wherein L is a nonacidic linking group preserving the basicity of the amino group and R″ being alkyl; chloromethyl; carboxy and a diazonium salt

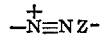

wherein Z is the residue of a strong acid and thereafter reacting said protein-reactive group X with an amino acid or an amino-acid terminated peptide or other protein to chemically bond the same to the graft copolymer through said substituent X.

23. A process according to claim 22 wherein the introduction of the group X or of a group used as an intermediate for it is carried out in the presence of a solvent capable of causing the surface of the solid graft copolymer to swell without dissolving the copolymer.

24. A process according to claim 22 wherein the vinyl aromatic compound carrying substituent Y is styrene and a nitro-group is introduced in the aromatic ring in the ortho position to X and where X is isothiocyanato or chloromethyl.

25. A process of producing graft copolymers according to claim 22 in shaped form.

26. A process according to claim 22 wherein the protein reactive graft copolymer is in the shape of a disc.

27. A process according to claim 22 wherein the protein reactive graft copolymer is porous.

28. A process according to claim 22 characterized in that the graft polymerization of the vinyl aromatic comer onto the polymeric backbone is carried out in the vapour phase and the polymeric backbone is porous.

References Cited

UNITED STATES PATENTS

| | | | |
|---|---|---|---|
| 3,250,640 | 5/1956 | Varlet | 117—62.2 |
| 3,165,487 | 1/1965 | Gardner et al. | 204—159.17 |
| 3,242,233 | 3/1966 | Chmiel et al. | 260—886 |
| 3,247,133 | 4/1966 | Chen | 204—159.17 |
| 3,298,942 | 1/1967 | Magat et al. | 260—2.1 E |

SAMUEL H. BLECH, Primary Examiner

M. FOELAK, Assistant Examiner

U.S. Cl. X.R.

3—1; 204—159.15, 159.17; 260—8, 78 A, 112, 112.5, 857, 874, 878, 884, 886

UNITED STATES PATENT OFFICE
CERTIFICATE OF CORRECTION

Patent No. 3,700,609          Dated October 24, 1972

Inventor(s) Geoffrey William Tregear et al

It is certified that error appears in the above-identified patent and that said Letters Patent are hereby corrected as shown below:

(1) In the formula of claim 1, one of the "X" substituents should be changed to "Y".

(2) In claims 12-18, line 1 of each claim, change "which" to --wherein the said graft copolymer--.

Signed and sealed this 27th day of November 1973.

(SEAL)
Attest:

EDWARD M. FLETCHER, JR.
Attesting Officer

RENE D. TEGTMEYER
Acting Commissioner of Patents